(12) United States Patent
Guercioni (10) Patent No.: US 8,627,868 B2
(45) Date of Patent: Jan. 14, 2014

(54) APPARATUS AND METHOD FOR MAKING PRE-SHAPED INSULATING SHEETS INTENDED TO BE INSERTED INTO STATOR OR ROTOR SLOTS

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 0 days.

(21) Appl. No.: 13/387,721

(22) PCT Filed: Mar. 19, 2010

(86) PCT No.: PCT/IT2010/000123
§ 371 (c)(1),
(2), (4) Date: Jan. 27, 2012

(87) PCT Pub. No.: WO2011/114360
PCT Pub. Date: Sep. 22, 2011

(65) Prior Publication Data
US 2012/0248926 A1    Oct. 4, 2012

(51) Int. Cl.
*B65H 35/00*    (2006.01)
*H02K 3/34*    (2006.01)

(52) U.S. Cl.
USPC ........... 156/463; 156/200; 156/465; 310/215; 493/442

(58) Field of Classification Search
USPC .......... 425/335, 336, 337, 343; 156/200, 202, 156/463, 465, 477.1; 493/440, 473, 439, 493/442, 443, 446, 447, 456; 29/887; 310/215; 428/119
See application file for complete search history.

(56) References Cited

U.S. PATENT DOCUMENTS 1,720,923 A * 7/1929 Poole ............................ 493/440
1,720,966 A * 7/1929 Poole ............................ 493/357
(Continued)

FOREIGN PATENT DOCUMENTS

| FR | 2 528 350 | 12/1983 |
| JP | 2005304277 | 10/2005 |
| RU | 1778876 A1 | 11/1992 |
| SU | 1130964 A | 12/1984 |

OTHER PUBLICATIONS

Search Report for IT RM20100123 dated Mar. 11, 2010.

(Continued)

*Primary Examiner* — William Bell
(74) *Attorney, Agent, or Firm* — Tarter Krinsky & Drogin LLP (57) ABSTRACT

Apparatus (30) for making pre-shaped insulating sheets (10) for use in a stator or in a rotor comprising shaping elements (40-44) such to produce, starting from a continuous strip (15) made of electrically insulating material having a flat or substantially flat cross section, a strip portion having a cross section comprising a central septum (20) and two lateral portions (21-23, 21'-23') joined to a respective end portion of the central septum (20), each of the lateral portions comprising a first section (21,21') joined to the central septum (20), a second section (22,22') joined and perpendicular, or essentially perpendicular, to the first section (21,21'), a third section (23, 23') joined to the second section (22,22') and inclined with respect to the latter towards the central septum (20). The apparatus (30) further comprises a pair of opposite rollers (46,47) having a transverse shaping profile comprising a projecting appendage (56, 57) suitable to be interfaced having a respective portion of the strip (15) facing the central septum (20) and operatively interposable between the central septum (20) and the third inclined section (23,23').

8 Claims, 6 Drawing Sheets

(56) References Cited

U.S. PATENT DOCUMENTS

| | | | | |
|---|---|---|---|---|
| 1,721,037 | A | * | 7/1929 | Poole .......................... 29/33 L |
| 4,038,741 | A | | 8/1977 | Schuler |
| 2009/0026868 | A1 | | 1/2009 | Morgante |
| 2011/0050026 | A1 | | 3/2011 | Kaiser |
| 2011/0204742 | A1 | | 8/2011 | Nakayama |

OTHER PUBLICATIONS

International Search Report for PCT/IT2010/000123 dated Mar. 15, 2010.

* cited by examiner

APPARATUS AND METHOD FOR MAKING PRE-SHAPED INSULATING SHEETS INTENDED TO BE INSERTED INTO STATOR OR ROTOR SLOTS

CROSS REFERENCE TO RELATED APPLICATIONS

This application is based on International Application No. PCT/IT2010/000123, filed on Mar. 19, 2010, the contents of which are incorporated herein by reference.

The present description refers to an apparatus and a method for making pre-shaped insulating sheets intended to be inserted into stator or rotor slots.

Known are methods for making stators or rotors for electric vehicles having a stator or rotor core having a plurality of slots and further comprising a plurality of rigid bar conductors inserted into the abovementioned slots and variously interconnected together to obtain one or more stator o rotor windings. The abovementioned stator or rotor windings with rigid bar conductors are commonly referred to as bar stator or rotor windings.

When making the abovementioned stators or rotors, with the aim of guaranteeing proper insulation between distinct conductors accommodated in the same slot and/or between the conductors and the internal walls of the slots of the stator or rotor core, provided for is an operation of inserting—into each slot—a respective sheet made of electrically insulating material, for example made of composite material. Depending on the contingent requirements, the shape and type of slots, the number of conductors to be inserted into the same slot, known is the solution for providing for that the abovementioned insulating sheet be suitably pre-shaped before being inserted into the respective slot. For example, known are pre-shaped insulating sheets having a C, U, S, Z-shaped cross section etc. Depending on the contingent requirements it is also possible to provide for inserting—in the same slot—two or more pre-shaped insulating sheets. The use of pre-shaped insulating sheets is also common even for making electric vehicles with wire windings.

In order to obtain the abovementioned pre-shaped insulating sheets starting from a continuous strip of insulating material wound in a storage reel, known are apparatus—referred to as shaping machines—comprising rollers, abutment cores and variously shaped guides, heaters, capable of performing one or more operations for folding the strip. The abovementioned machines also comprise elements suitable for cutting portions of the strip to the desired length, generally after performing the abovementioned folding operations.

Should the cross-section of the pre-shaped insulating sheet have a relatively complex profile, such as for example in the case of an S-shaped or Z-shaped cross-section, provided for in the abovementioned shaping machines are lubricating means suitable to release controlled doses of lubricant intended to come into contact with the strip and, directly or indirectly, with parts of the machine at direct contact with the strip. Such lubricant is practically used for reducing oblique frictions which may occur between the insulating material strip and the abutment cores for folding the strip.

The use of lubricants reveals several drawbacks. For example, it is clear that the abovementioned lubricants tend to impregnate the strip or to stick to the surface thereof, hence the pre-shaped insulating sheets are contaminated with the lubricant. This may cause problems in the subsequent machining steps, for example when welding the bar conductors of the winding, or problems regarding the characteristics of the end products i.e. regarding the stators or rotors and generally electric vehicles wherein the pre-shaped sheets are intended to be used.

Furthermore, the lubricants tend to provide conditions for the sticking of unwanted particles of materials of various types (dusts, small fragments that are produced during the machining) against the parts of the shaping machines intended to come into contact with the insulating material strip. In such manner, the pre-shaped insulating sheet may be contaminated not only by the lubricant but also by the unwanted particles of materials of various types.

Furthermore, providing for lubricating means in the shaping machines relatively complicates the development, management and maintenance of such machines. For example, such is the case of the entire part of the shaping machine meant for dispensing the controlled dose of lubricant or for example the need to periodically refill the lubricant tank.

The use of lubricants also implies problems regarding environmental pollution and the health of the operators, in that given that the folding of the strip requires—in the shaping machines—hot parts suitable to come to contact with the strip, the heating of the lubricant causes the release of toxic or polluting fumes or vapours.

Thus, there arises the need to have an apparatus for making pre-shaped insulating sheets capable of overcoming the drawbacks described above with reference to the prior art.

The present invention has the object of providing an apparatus capable of allowing meeting the need indicated above.

The abovementioned object is attained by means of an apparatus as generally defined in the first claim in the most general embodiment thereof and in the dependent claims in some particular embodiments.

A further object of the present description is that of providing a method for making pre-shaped insulating sheets.

Another object of the present invention is that of providing a pre-shaped insulating sheet that is free of contamination by lubricants used for making pre-shaped insulating sheets.

Another object of the present invention is that of providing an electric vehicle having a stator or a rotor, comprising a stator or rotor core and a plurality of slots accommodating pre-shaped insulating sheets, wherein the pre-shaped insulating sheets are free of contamination by lubricants.

The invention shall be better understood from the following detailed description of embodiments thereof provided for exemplifying purposes and thus not restrictive in any manner whatsoever with reference to the attached drawings, wherein.

In the figures, identical or similar elements are indicated using the same reference numbers.

Regarding the present description the term "flat" or "square" bar conductor is used to indicate a bar conductor having four substantially flat sides, each joined at the adjacent sides, typically by a rounded corner.

Therefore, the terms "flat" or "square" or equivalent words used to describe the cross section of a bar conductor are used generally and they shall not be deemed to actually exclude the fact that such bar conductors have considerably rounded corners that join the substantially flat sides. The term "flat conductor" shall be understood in the sense that the conductor has two opposite sides whose distance is greater with respect to the distance between the remaining two opposite sides. Regarding the present description the term "rectangular conductor" shall be understood as a generalisation of the flat conductor and of the square conductor, given that the square-shaped conductor is a special case of a rectangular conductor, wherein the four sides are equally dimensioned.

Figure 1:
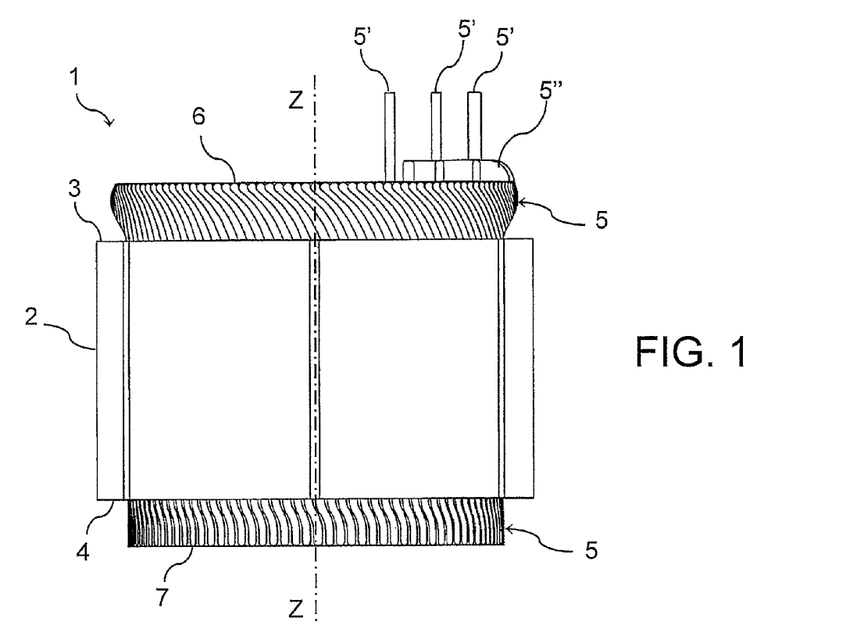
FIG. 1 schematically shows a side view of a stator for an electric vehicle, comprising a stator core and a bar stator winding.

Referring to the figures, indicated in its entirety with 1 is a stator comprising a stator core 2. For example, the stator 1 is the stator of an electric vehicle such as for example an electric engine, for example for an electric or hybrid drive vehicle.

It is clear that the stator 1 may also be used in an electric vehicle used as a generator or used both for alternatively serving both as an engine and as a generator. Represented in the attached figures is only the stator 1 of such electric vehicle in that it is deemed that the remaining parts of an electric vehicle or generally of an electric or hybrid drive vehicle are extensively known to a man skilled in the art.

For the sake of simplicity and description brevity, a rotor shall not be described in detail herein given that it is deemed that a man skilled in the art, who knows the structure of a rotor well, may easily implement the disclosures of the present description for making pre-shaped insulating sheets to be inserted into the slots of a rotor core.

Referring to FIG. 1, in a per se known manner, the stator core 2 comprises a laminated tubular main body for example made of magnetic material, which is extended axially (axis Z-Z) between two opposite faces 3,4.

The main body of the stator core 2 comprises a plurality of slots 8 extended axially in the thickness of the main body and which are suitable to receive rectangular bar conductors 5, 5', 5" which together form at least one bar stator winding. According to an embodiment, preferred but not restrictive, the rectangular bar conductors 5, 5', 5" are coated on the surface by a layer of insulating material, such as for example an insulating resin glaze. In an alternative embodiment, the abovementioned rectangular conductors could be without an insulating coating.

According to an embodiment, the rectangular bar conductors 5, 5', 5" comprise a first assembly of standard conductors 5, which are U-shaped bar conductors (also referred to as "hairpin conductors"), and a second assembly of special conductors 5', 5" which for example comprise terminals 5' or jumpers 5". The U-shaped conductors have a fold portion 6 which projects from a face 3 of the stator core 2, or insertion face 3, and two portions of free ends 7 which project from the other face 4 of stator core 2, or welding face 4.

According to an embodiment, the abovementioned bar conductors 5, 5', 5" are conductors made of copper and they are flat conductors, in that they have a pair of opposite faces which are spaced from each other more than the other two opposite faces are spaced from each other.

The description outlined up to this point is part of the knowledge of a man skilled in the art and thus it shall not be outlined further in detail.

Figure 2:
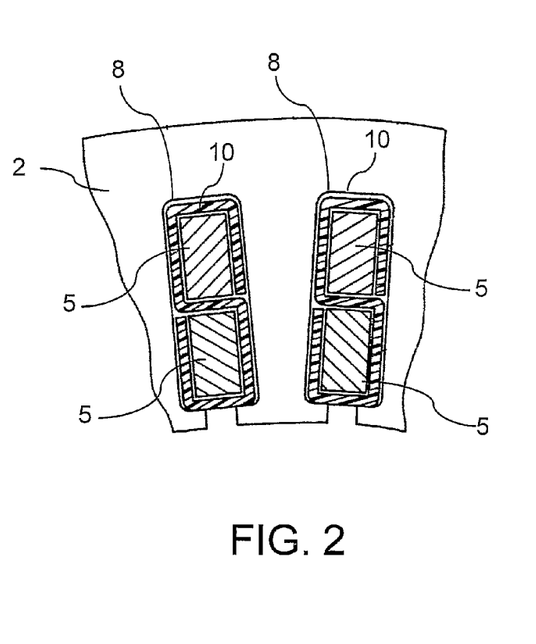
FIG. 2 schematically shows a top view of a portion of the stator core, observable in which are two slots filled with insulating sheets and bar conductors.

Referring to FIG. 2, each slot 8 of the stator core 2 is passed through by at least one of the abovementioned bar conductors 5, 5', 5 and it accommodates a sheet 10 made of insulating material. As known by a man skilled in the art, the characteristics of the insulating sheet 10 are conveniently selected depending on the electrical power in question and depending on the operating temperature.

According to a possible embodiment, exemplifying and non-limiting, the insulating sheet is a multiplayer sheet comprising two layers of TufQUIN™ (3M™) coupled, for example glued, to the two opposite faces of a central sheet made of polyester.

According to a specific and non-limiting embodiment selected from among the many possible, each slot 8 is passed through by at least one pair of rectangular bar conductors 5, 5', 5" and each core accommodates a sheet made of insulating material with an S-shaped cross section. According to a variant embodiment, the sheets made of insulating materials have a Z-shaped cross section wherein the term "Z-shaped" is simply used to indicate a shape mirror symmetric with respect to an S-shape. For the sake of simplicity, from now henceforth reference shall be made, without introducing any limitations therefore, to the case wherein the insulating sheets have an S-shaped cross section.

According to an embodiment, as shown in FIG. 2, in cases where the bar conductors 5 are flat, the two bar conductors 5 within the same slot 8 are aligned along a respective short side thereof.

In cases where the slots 8 are each passed through by more than two bar conductors 5, 5', 5" it is possible to provide for inserting more than one S-shaped pre-shaped insulating sheet 10 for each slot 8, for example an insulating sheet 10 pre-shaped to form an S for each pair of bar conductors that pass through the slot 8.

According to the present description the term pre-shaped insulating sheet is used to indicate an insulating sheet 10 which has been subjected—before being inserted into the slot 8—to a machining process suitable to fold the sheet and confer to the sheet its own stable shape with a non-flat cross section.

Figure 3:
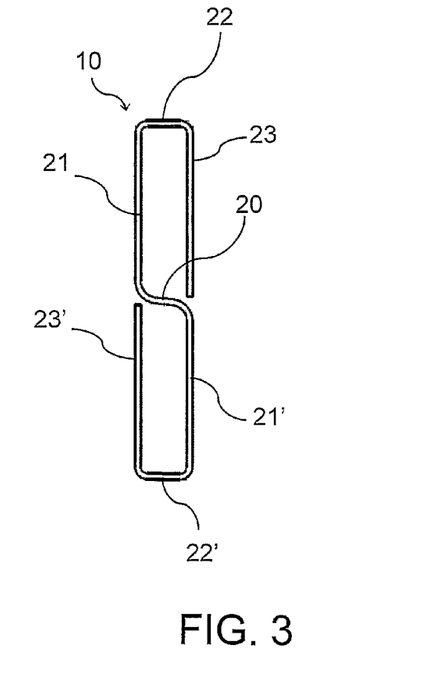
FIG. 3 schematically shows a cross sectional view of a pre-shaped insulating sheet.

FIG. 3 shows an S-shaped cross section of a particular example of a pre-shaped insulating sheet 10. As observable, the cross section of the pre-shaped insulating sheet 10 comprises a central septum 20 and two lateral portions 20,21,22 and 20',21',22' connected to a respective end portion of the central septum 20. Each lateral portion 20,21,22 and 20',21', 22' is essentially U-shaped and comprises—starting from the central septum 20—in the following order:

a first section 21, 21' joined to the central septum;

a second section 22, 22' joined and perpendicular, or essentially perpendicular, to the first section 21,21';

a third section 23,23' joined and perpendicular, or essentially perpendicular, to the second section 22,22'.

The expression "essentially perpendicular" is used in this context to indicate possible embodiments wherein there is no a precise perpendicular condition but wherein the cross section of the sheet may however be defined as essentially S-shaped (Z-shaped). This occurs in cases wherein, as represented in FIG. 2, for example the cross section of the central septum 10 is not exactly rectilinear but it is also approximately ʃ-shaped ("stylized S-shape" used as the symbol for the mathematical function of integration).

Figure 4:
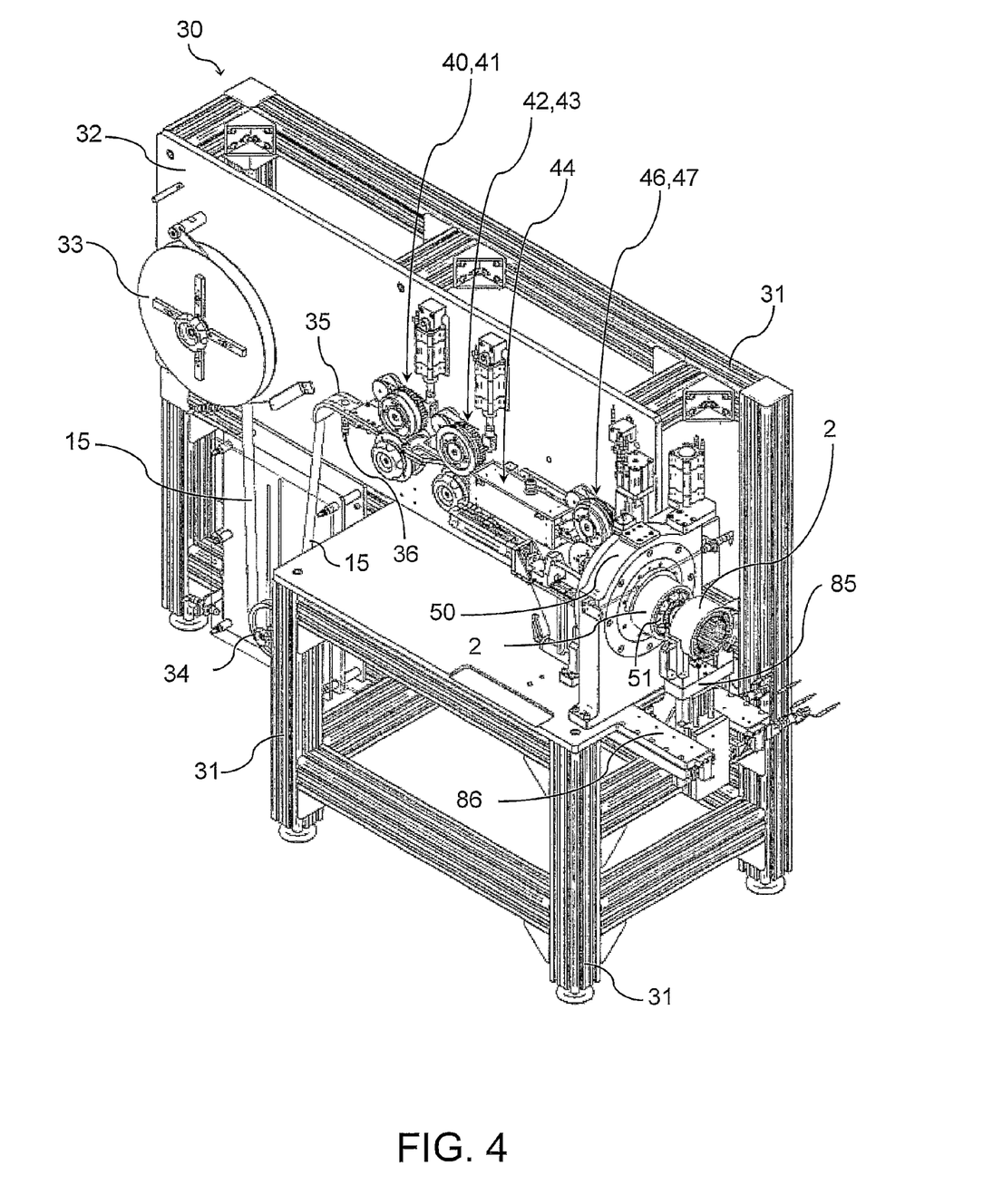
FIG. 4 shows a perspective view of a an apparatus for making pre-shaped insulating sheets starting from a continuous strip of insulating material.

Shown in FIG. 4 is a perspective view of a possible embodiment of an apparatus 30 for making the abovementioned pre-shaped insulating sheets 10.

The apparatus 30 comprises a support structure 31, 32 comprising a support metal framework 31 and a support panel 32. The apparatus 30, starting from a continuous strip 15 made of insulating material kept in a protective support 33 pivotably fixed to the support panel 32, is conceived to fold and cut the strip 15 for making pre-shaped insulating sheets 10 of the desired length and insert such pre-shaped insulating sheets 10 into the slots 8 of a stator core 2. Therefore, the apparatus 30 can be defined as a machine for insulating stators 1. It should be observed that the disclosures of the present description may also be transposed to a machine for insulating rotors.

According to an embodiment, the apparatus 30 comprises a rotating and motorised storage drum 50 suitable to accommodate the pre-shaped insulating sheets 10 before the latter are transferred into the stator 1. According to an embodiment, the apparatus 30 further comprises a support device 51, for bearing a stator core 2, suitable to position and hold a stator core 2 in position during the transfer of the pre-shaped insulating sheets 10 from the rotating storage drum 50 to the stator core 2. The apparatus 30 further comprises a loading unit 85 for example fixed to a sliding guide 86 and suitable to position a stator core 2 to be insulated onto the stator core-bearing support device 51. In the attached figures, and in particular in FIGS. 4 and 12, the stator core 2 was represented both on the loading unit 85 and on the stator core-bearing support device 51, even though in an actual operative condition of the machine 1 the stator core 2 shall be positioned in mutually exclusive manner either on the loading unit 85 or on the support device 51.

The apparatus 30 of the example of FIG. 4 further comprises a idler pulley 34 for the strip 15 and a supply guide 35 conveniently associated to which is a strip presence sensor 36.

Figure 9:
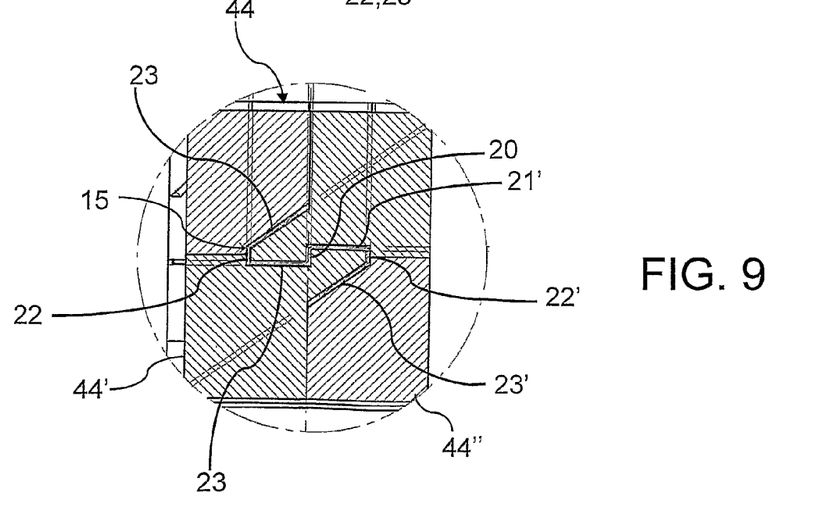
FIG. 9 shows a part of the apparatus of FIG. 6 sectioned along the transverse axis z3.

Referring to FIGS. 4 and 9, the apparatus 30 comprises shaping elements 40-44 such to produce—starting from a continuous strip 15 made of electrically insulating material having a flat, or substantially flat cross section—a strip portion having a cross section comprising a central connection septum 20 and two lateral portions 21-23 and 21'-23' connected to a respective end portion of the central septum 20.

Each of the abovementioned lateral portions 21-23 and 21'-23' is essentially U-shaped and comprises, in the following order starting from central septum 20:

a first section 21, 21' joined to the central septum 20;

a second section 22, 22' joined and perpendicular, or essentially perpendicular, to the first section 21,21';

a third section 23,23' joined to the second section 22,22' and inclined with respect to the latter towards the central septum 20.

Figure 10:
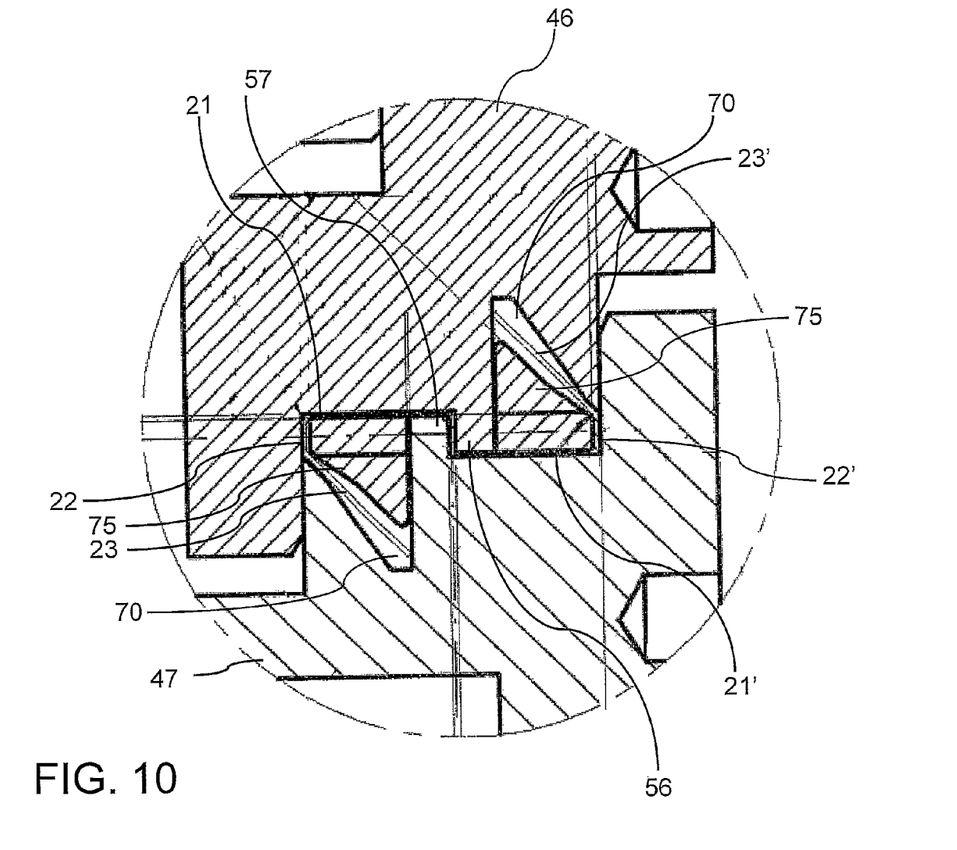
FIG. 10 shows a part of the apparatus of FIG. 6 sectioned along the transverse axis z4.

Referring to FIGS. 4 and 10, the apparatus 30 further comprises a pair of opposite rollers 46, 47 having a shaping profile comprising a projecting appendage 56, 57 suitable to be interfaced with a respective strip portion 15 facing the central septum 20, the projecting appendage 56, 57 being operatively interposable between the central septum 20 and the third inclined section 23, 23' during the passage of the strip 15 between the pair of opposite rollers 46,47.

Figure 7:
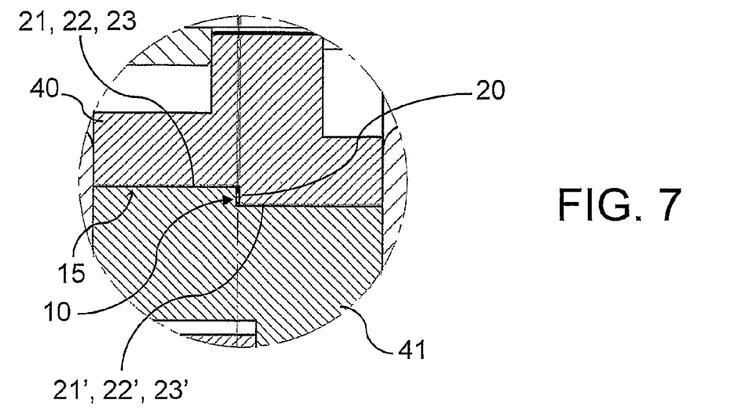
FIG. 7 shows a part of the apparatus of FIG. 6 sectioned along the transverse axis z1, where the term transverse axis is used to indicate the direction perpendicular to the main direction of longitudinal extension of the strip when the strip is loaded into the apparatus 1 (direction x-x in FIGS. 5 and 6)
Figure 8:
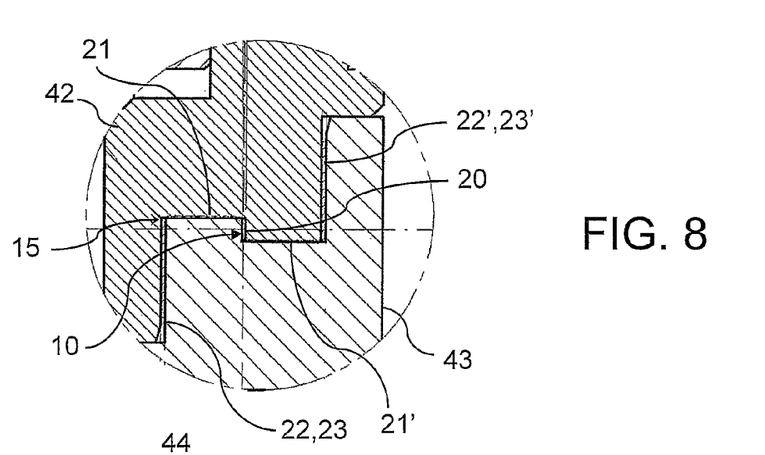
FIG. 8 shows a part of the apparatus of FIG. 6 sectioned along the transverse axis z2.

Referring to FIGS. 7,8,9, according to an embodiment, the shaping elements 40-44 comprise:

a first pair of opposite rollers 40,41 having a transverse shaping profile (shown in FIG. 7) such to produce, starting from a strip 15 having a substantially flat cross section, a strip 15 having a step-shaped cross section, comprising the central connection septum 20 and two lateral portions 21-23 and 21'-23' (FIG. 7) perpendicular or essentially perpendicular to the central connection septum 20;

a second pair of opposite rollers 42,43 having a shaping profile such to be folded to form an L (FIG. 8) and parts opposite to each of the lateral portions 21-23 and 21'-23';

a shaping device 44 suitable to incline towards the central septum 20 a portion 23, 23' of said lateral portions 21-23 and 21'-23' L-shaped with respect to a remaining portion 21,22 and 21', 22' of the lateral L-shaped portions for making the third inclined section 23, 23' (FIG. 9).

It should be observed that in the abovementioned embodiment the first pair of opposite rollers 40, 41 has a transverse shaping profile suitable to produce a double central folding in the strip 15. The second pair of opposite rollers 42, 43 has a shaping profile suitable to produce two lateral folds in the strip 15 and the shaping device 44 is such to produce two further lateral folds in the strip 15.

According to an embodiment, the surface of all the abovementioned rollers 40-43 and 46-47 intended to contact the surface of the strip 15 are knurled surfaces. Preferably, all the abovementioned rollers 40-43 and 46-47 are provided with a teething arranged laterally with respect to the knurled surface which serves to rotatingly constrain the two rollers of the same pair of rollers together.

According to an embodiment, the first pair of rollers 40, 41 is arranged at the exit of the first supply guide 35 and it is a pair of idle rollers, i.e. not motorised, comprising a roller with fixed rotational axis 41 and a roller 40 with adjustable rotational axis, for example by means of a pneumatic cylinder 38 and a rotating arm 66. Providing a roller 40 with adjustable rotational axis allows adjusting the distance between the two rollers 40, 41 in such a manner to always guarantee that the rollers 40, 41 press with an optimal pressure against the surface of the strip 15.

Figure 5:
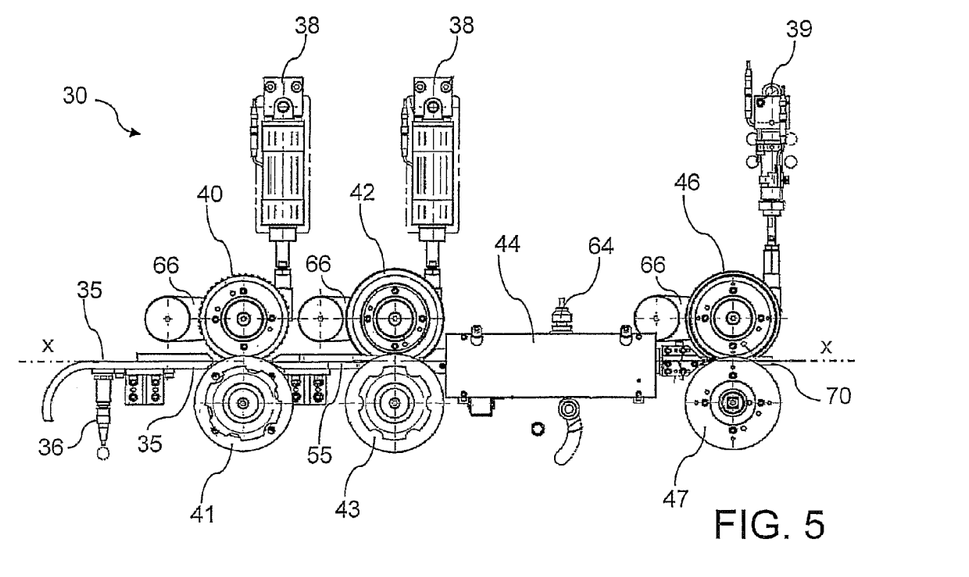
FIG. 5 shows a side plane view shown in which are some parts of the apparatus of FIG. 4.
Figure 6:
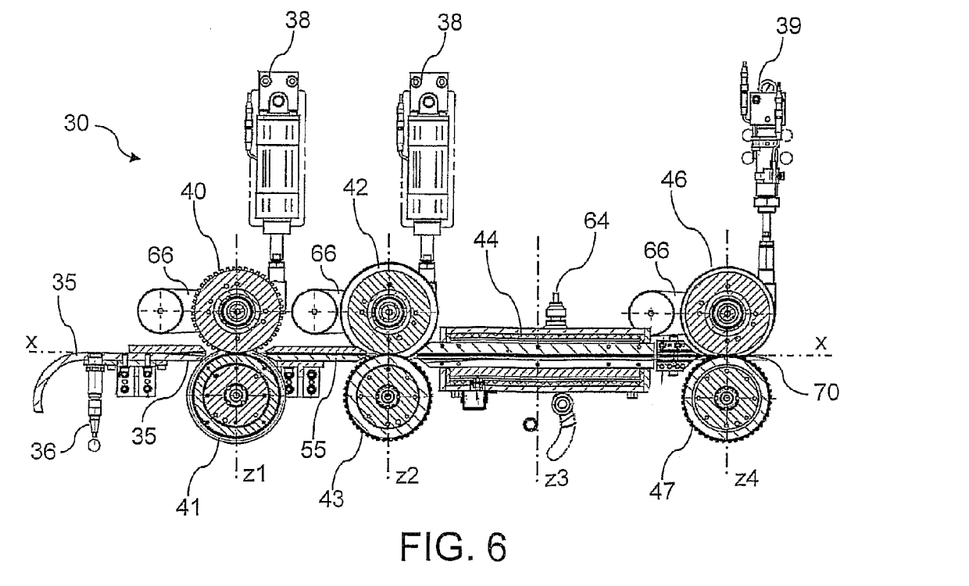
FIG. 6 shows a side sectional view wherein the parts represented in FIG. 5 are shown sectioned along the main extension axis of the strip.

As observable in FIGS. 5 and 6, the apparatus 30 comprises the first 40, 41 and the second pair 42, 43 of rollers opposite a second guide 55 intended to keep—up to the entrance of the second pair of rollers 42, 43—the transverse profile of the strip 15 as most similar possible to that immediately produced at the exit of the first pair of opposite rollers 40, 41.

According to an embodiment, the second pair of rollers 42, 43 comprises a roller with fixed rotational axis 43 and a roller 42 with adjustable rotational axis, for example by means of a pneumatic cylinder 38 and a rotating arm 66. According to an embodiment, the roller with fixed axis 43 is operatively connected for example by means of a belt to a motor which controls rotation thereof. In the exemplified embodiment, the abovementioned movement members (belt and motor) are arranged with respect to the rollers on the opposite face of the panel 32 and thus they are not visible in the attached figures.

In the exemplified embodiment, the apparatus 30 comprises—at the exit of the second pair of opposite rollers 42, 43 a heating device 44 suitable to fold and incline the sections 23, 23' of the cross section of the strip 15. As represented in FIG. 9, preferably the device 44 is implemented by a heating box 44 comprising a outer container accommodating two interior cores 44', 44" counter-shaped and heated for example by a thermocouple 64. Preferably, the heating box 44 is such to bear a paper strip 15 at a temperature exceeding 100° C., preferably comprised between 100° C. and 150° C. and more preferably equivalent to about 120° C.

As observable in the FIGS. 5 and 6, the apparatus 30 comprises—between the heating box 44 and the pair of opposite rollers 46, 47—a second guide 55 conceived to keep—up to entrance into the pair of opposite rollers 46, 47—the transverse profile of the strip 15 as similar as possible to that immediately produced exiting from the heating box 44.

According to an embodiment, the pair of rollers 46, (or "third pair" of rollers) comprises a roller with fixed rotational axis 47 and a roller 46 with adjustable rotational axis, for example by means of a pneumatic cylinder 39 and a rotating arm 66. According to an embodiment, the roller with fixed axis 47 is operatively connected for example through a belt to a motor which imparts rotation thereof. According to an advantageous embodiment, the two rollers with fixed axis 43 and 47 (respectively of the second and third pair of rollers) are connected through the same belt to a shaft of the same electric engine.

Referring to FIG. 10, according to an embodiment the apparatus 30 also comprises a pair of cores 75 interposed between the rollers 46, 47 of the third pair of opposite rollers, each core 75 being arranged adjacent to a respective projecting appendage 56,57 of said rollers 46,47. According to an embodiment the cores 75 have a trapezoidal cross section, or essentially trapezoidal, and preferably a section shaped to form a trapezoid rectangle. According to currently less preferred embodiment the abovementioned cross section is a section which is quadrangular instead of being trapezoidal.

According to an embodiment, the appendages 56, 57 of the rollers 46, 47 have a quadrangular-shaped cross section.

Figure 11:
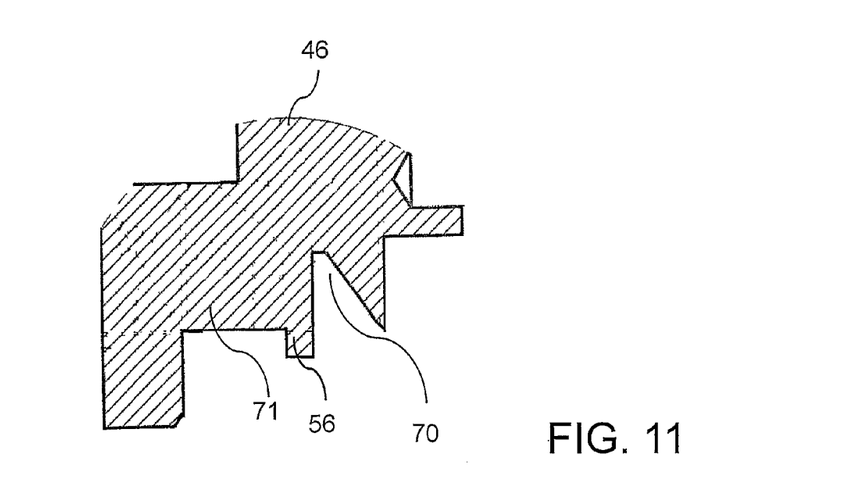
FIG. 11 shows an enlarged part of FIG. 10.

Referring to FIGS. 10 and 11, and in particular to FIG. 11 wherein—for the sake of clarity—only one part of the roller 46 was represented, in the transverse profile of the shaping of the rollers 46, 47 of the third pair of rollers, the projecting appendage 56, 57 is interposed between a flat-shaped portion 71 of the roller 46, 47 receded with respect to the projecting appendage 56, 57 and a core profile portion 70 suitable to accommodate the inclined section 23, 23' when the strip 15 passes between the abovementioned rollers 46, 47. The abovementioned core profile portion 70 is preferably shaped to form a trapezoid rectangle or a rectangle-triangle shape (as an approximation of the rectangle trapezoid).

Referring to FIG. 10, it should be observed that should the projecting appendages 56, 57 of the rollers 46, 47 be arranged operatively adjacent to each other and arranged on opposite sides with respect to the central septum 20 of the strip 15, when the strip 15 passes between the opposite rollers 46, 47, operatively interposed between the projecting appendages 56, 57 is a step portion of the transverse portion of the strip 15 centered around the central septum 20.

Still referring to FIG. 10, according to an embodiment the two opposite faces of the inclined section 23, 23' of the strip 15 are neither fastened by any of the rollers 46, 47 nor by the cores 75 given that they are left free within a respective gap defined between each core 75 and a respective roller 46, 47.

Referring to the description outlined above it should be observed that the second 42, 43 and the third 46,47 pair of rollers serve both the function of shaping the strip 25 and the function of drawing the strip 15. The second pair of rollers 42, 43 is in particular intended for shaping and drawing the strip 15 before it enters into the heated box 44 while the third pair of rollers is intended to stabilize the shape of the strip 15 and draw the strip upon exit from the heated box 44.

Figure 12:
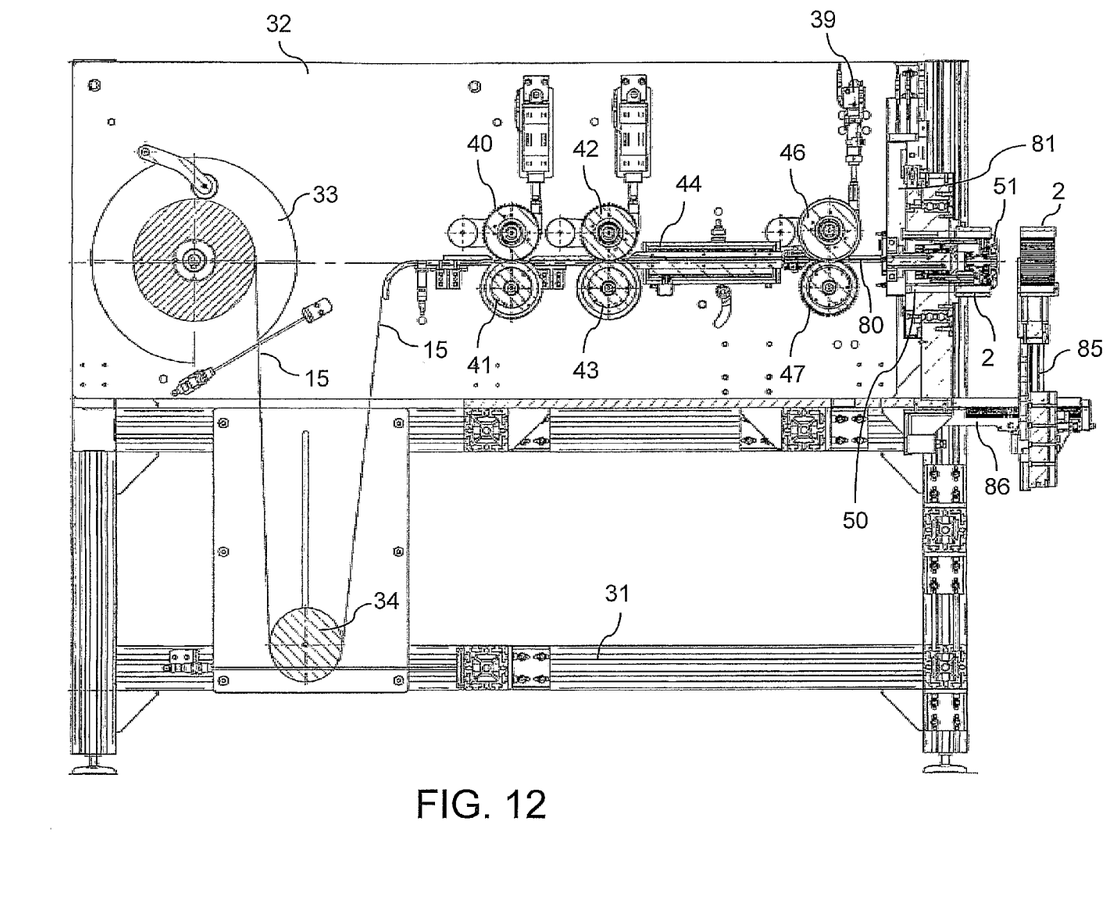
FIG. 12 shows a full view—in lateral section—of the apparatus of FIG. 4.

Referring to FIG. 12, according to an embodiment, the apparatus 30 also comprises a rectangular cross section guide 80 arranged downstream of the pair of rollers 46, 47. Preferably, such guide 80 is a heated guide.

The apparatus 30 further comprises a cutting device suitable to cut portions of the pre-shaped strip 15 exiting from the rectangular guide 80 once a strip portion of predetermined length has been inserted into a core of the storage drum 50. For example, the abovementioned cutting device 81 comprises a vertical column 81 which slidingly accommodates a guillotine blade (not shown in the figures) therein.

From the description outlined above it is evincible how an apparatus like the one described above allows pre-shaped insulating sheets to be formed by means of pre-shaping method comprising the steps of:

shaping (in the example through the first and the second pair of rollers and the heating box 44) a strip 15 made of electrically insulating material having a flat or substantially flat cross section, in such a manner to obtain a strip portion having a cross section comprising a central septum 20 and two lateral portions 21-23 and 21'-23' joined to a respective end portion of the central septum 20, each lateral portion comprising, in the following order starting from a central septum 20: a first section 21, 21' having a first end joined to the central septum 20, a second section 22,22' joined and perpendicular, or essentially perpendicular, to the first section 21, 21', and a third section joined to the second section and inclined with respect to the latter towards said central septum 20;

passing the abovementioned shaped strip between two opposite rollers 46, 47 having a transverse shaping profile with projecting appendages 66, 67 such that a step-shaped continuous portion of said strip centered around the central septum 20 is operatively interposed between said rollers 46, 47 and it has each of the two opposite faces of the strip which is respectively at contact with the roller of said opposite rollers 46, 47.

Experiments have shown that an apparatus and a method as described above fully allows attaining the preset objects, given that pre-shaped insulating sheets may be provided having their own stable shape having an S-shaped or Z-shaped cross section without using lubricants in the manufacturing process. The abovementioned insulating sheets are thus free of contamination by lubricants (or substantially uncontaminated, i.e. free of contamination by lubricants except for impure traces of lesser significance in any case not intentionally produced and not provided for in the pre-shaping operations).

Obviously, an apparatus and a method of the type described above may be subjected to numerous modifications and variants—by a man skilled in the art with the aim of meeting contingent and specific requirements—all falling within the scope of protection of the invention, as defined by the claims that follow.

The invention claimed is:

1. Apparatus for making pre-shaped insulating sheets comprising:

shaping elements adapted for producing, starting from a continuous strip made of electrically insulating material having a flat or substantially flat cross section, a strip portion having a cross section comprising a central septum and two lateral portions joined to a respective end portion of the central septum, each of the lateral portions comprising a first section joined to the central septum, a second section joined and perpendicular, or essentially perpendicular, to the first section, a third section joined to the second section and inclined with respect to the latter towards the central septum;

a pair of opposite rollers each having a transverse shaping profile comprising a projecting appendage adapted to be interfaced with a respective portion of the strip facing the central septum and adapted to be operatively interposed between the central septum and the third inclined section when the strip passes between the pair of opposite rollers in a configuration of said strip in which said third section joined to the second section is inclined with respect to the latter towards the central septum.

2. Apparatus according to claim 1, further comprising a guide having a rectangular cross section arranged downstream of the pair of opposite rollers.

3. Apparatus according to claim 1, further comprising a pair of cores interposed between said opposite rollers, each of such cores being arranged adjacent to a respective projecting appendage.

4. Apparatus according to claim 3, wherein the cores have a trapezoidal or essentially trapezoidal cross section.

5. Apparatus according to claim 1, wherein said appendages have a quadrangular-shaped section.

6. Apparatus according to claim 1, wherein in the each transverse shaping profile, the projecting appendage is interposed between a flat profile portion receded with respect to said appendage and a core profile portion suitable to accommodate said inclined section when the strip passes between the pair of opposite rollers.

7. Apparatus according to claim 1, wherein the projecting appendages of the opposite rollers are arranged operatively adjacent to each other and arranged on opposite sides with respect to the central septum hence, when the strip passes between said pair of opposite rollers, operatively interposed between said appendages is a step portion of the strip centred around the central septum.

8. Apparatus according to claim 1, wherein said shaping elements-comprise in the following order:
a first pair of opposite rollers having a shape profile such to produce, starting from a strip having a substantially flat cross section, a strip having a step-shaped cross section, comprising said central septum and two lateral portions essentially perpendicular to the central septum;
a second pair of opposite rollers having a shape profile such to fold to form an L-shaped portion on opposite sides each of said lateral portions;
a shaping device suitable to incline towards the central septum a portion of said lateral L-shaped portions with respect to a remaining portion of said lateral portions folded to form an L to obtain said third inclined section;
said pair of opposite rollers having a transverse shaping profile comprising a projecting appendage.

* * * * *